(12) United States Patent
Rofougaran

(10) Patent No.: US 7,899,429 B2
(45) Date of Patent: *Mar. 1, 2011

(54) RF TRANSCEIVER WITH UNDESIRED SIGNAL REJECTION AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,709

(22) Filed: Nov. 9, 2009

(65) Prior Publication Data

US 2010/0056071 A1    Mar. 4, 2010

Related U.S. Application Data

(63) Continuation of application No. 11/521,936, filed on Sep. 15, 2006, now Pat. No. 7,647,035.

(51) Int. Cl.
*H04B 1/26* (2006.01)
*H04B 15/00* (2006.01)

(52) U.S. Cl. ......................... 455/313; 455/314; 455/315

(58) Field of Classification Search ................. 455/313, 455/314, 315, 73, 78, 83, 63.1, 249.1, 255, 455/256, 258, 296

See application file for complete search history.

(56) References Cited

U.S. PATENT DOCUMENTS

| 4,799,066 | A | 1/1989 | Deacon |
| 6,061,025 | A | 5/2000 | Jackson |
| 7,142,811 | B2 | 11/2006 | Terranova |
| 7,248,625 | B2 * | 7/2007 | Chien ..................... 375/219 |
| 7,382,791 | B2 | 6/2008 | Thermond |
| 7,647,035 | B2 * | 1/2010 | Rofougaran ............. 455/313 |
| 2004/0196813 | A1 | 10/2004 | Ofek |
| 2005/0212604 | A1 | 9/2005 | Cyr |
| 2006/0038658 | A1 | 2/2006 | Jarvis |

* cited by examiner

*Primary Examiner*—Eugene Yun
(74) *Attorney, Agent, or Firm*—Garlick Harrison & Markison; Bruce E. Stuckman

(57) ABSTRACT

A radio frequency (RF) transceiver includes an RF transmitter that generates an outbound RF signal at a carrier frequency that is based on a transmitter local oscillation. An RF front-end receives an inbound RF signal that includes a desired signal component that is based on the outbound RF signal and that includes an undesired signal component. The RF front-end includes a first RF combiner module that attenuates the undesired signal component to produce a desired RF signal. A down conversion module generates a down converted signal from the desired RF signal based on a receiver local oscillation. A receiver processing module generates inbound data from the down converted signal. A frequency control module controls a frequency of the transmitter local oscillation and a frequency of the receiver local oscillation, based on an interference rejection signal, to control the attenuation of the undesired signal component.

18 Claims, 9 Drawing Sheets

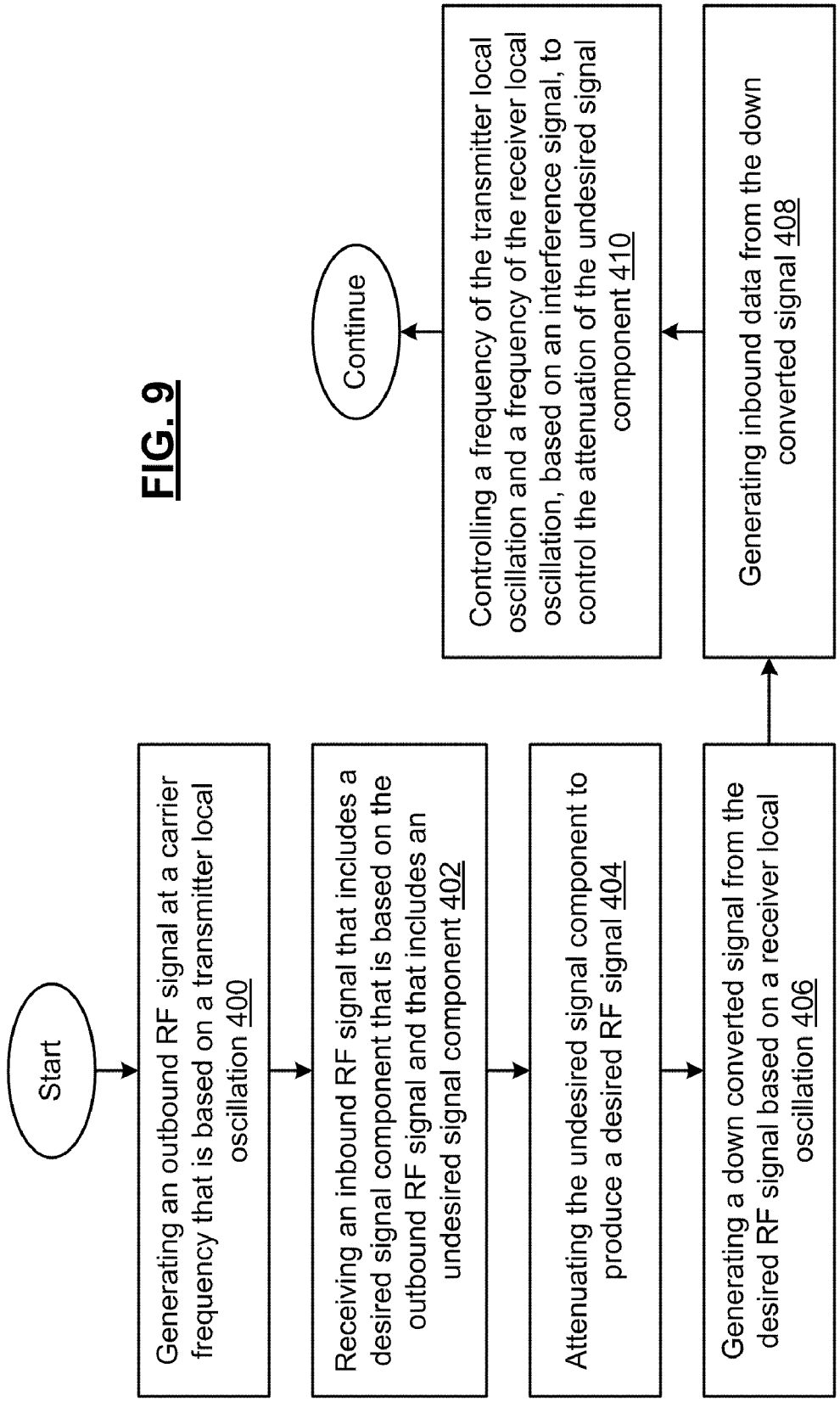

RF TRANSCEIVER WITH UNDESIRED SIGNAL REJECTION AND METHODS FOR USE THEREWITH

CROSS REFERENCE TO RELATED APPLICATIONS

This application claims priority under 35 USC 120 as a continuation of the copending application entitled, "RF TRANSCEIVER WITH UNDESIRED SIGNAL REJECTION AND METHODS FOR USE THEREWITH", having Ser. No. 11/521,936, filed on Sep. 15, 2006.

BACKGROUND OF THE INVENTION

1. Technical Field of the Invention

This invention relates generally to wireless communications systems and more particularly to radio transceivers used within such wireless communication systems that include RF tags.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a receiver to reliably recover data from received inbound RF signals it must be able to isolate desired signal components of the inbound RF signals from interferers (e.g., interference from adjacent channel(s), interference from other devices and/or systems using frequencies near the frequency band of interest, and/or transmission blocking signals that occur in RFID systems). For example, in a cellular system, it is fairly common to have significant nearby interferers of the frequency band of interest (e.g., one or more desired channel(s) of 5-60 MHz centered at a frequency of about 900 MHz, 1800 MHz, 1900 MHz, and/or 2100 MHz) that adversely affect the ability of a receiver to accurately recover data.

One solution to reduce the adverse affects caused by interferers is to use an off-chip band pass filter (BPF) prior to the LNA to attenuate the interferers and pass the desired channel(s). However, with nearby interferers (e.g., within 100 MHz), the BPF needs a steep roll off to sufficiently attenuate the interferers making it an expensive part. In addition, an off-chip BPF typically reduces the magnitude of the desired channel(s) by about 3 dB.

Another solution is to use a less expensive BPF with less roll off. While this reduces the cost and the attenuation of the desired channel(s), it does not sufficiently attenuate large nearby interferers.

Therefore, a need exists for a radio receiver and RF front end that sufficiently attenuated interferers without the use of costly BPFs and with negligible attenuation of the desired channel(s).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 9 is a flowchart representation of a method in accordance with an embodiment of the present invention.

DETAILED DESCRIPTION OF THE INVENTION

Figure 1:
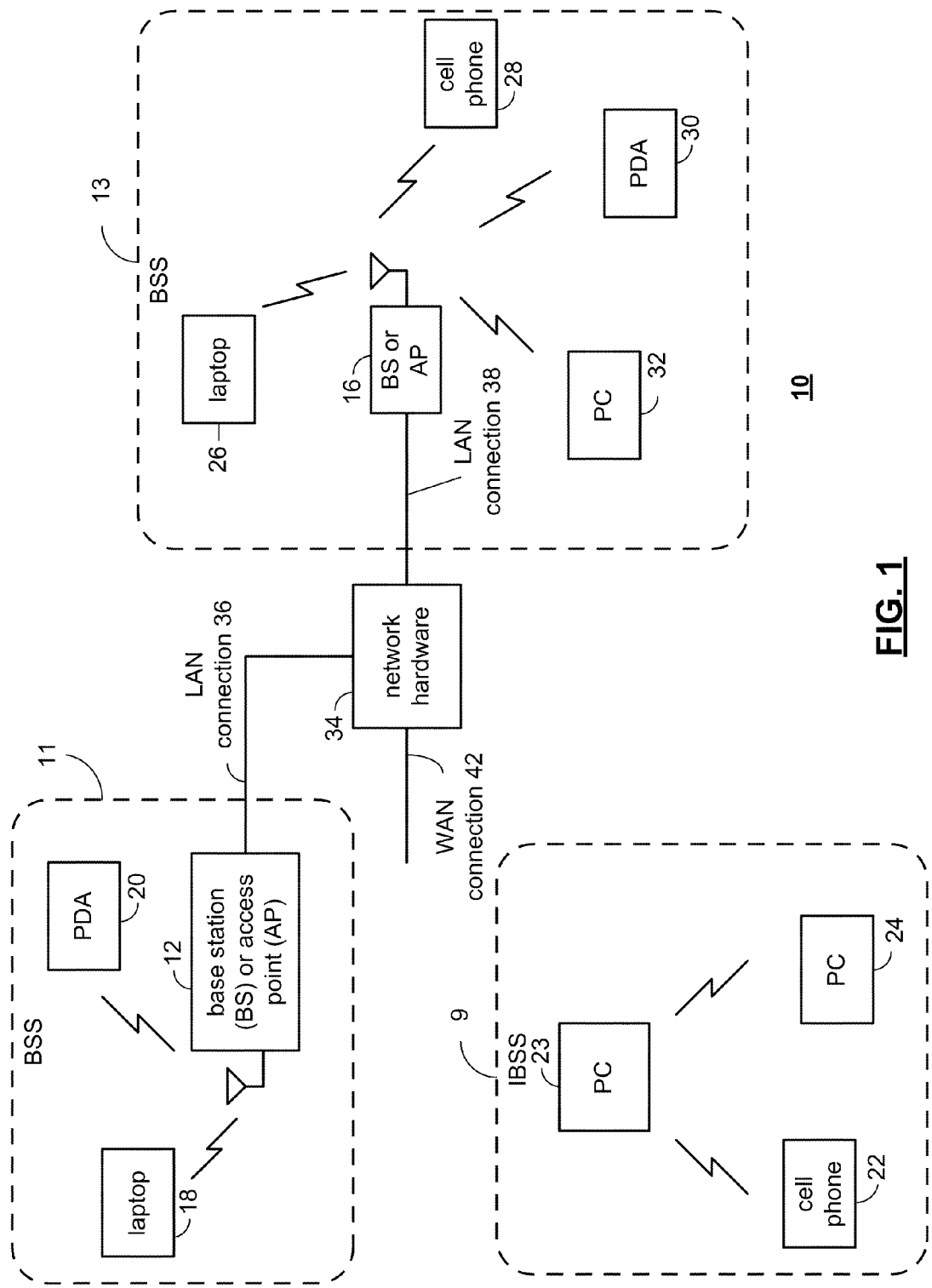
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless transceiver. The details of the wireless transceiver will be described in greater detail with reference to FIGS. 3-7.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
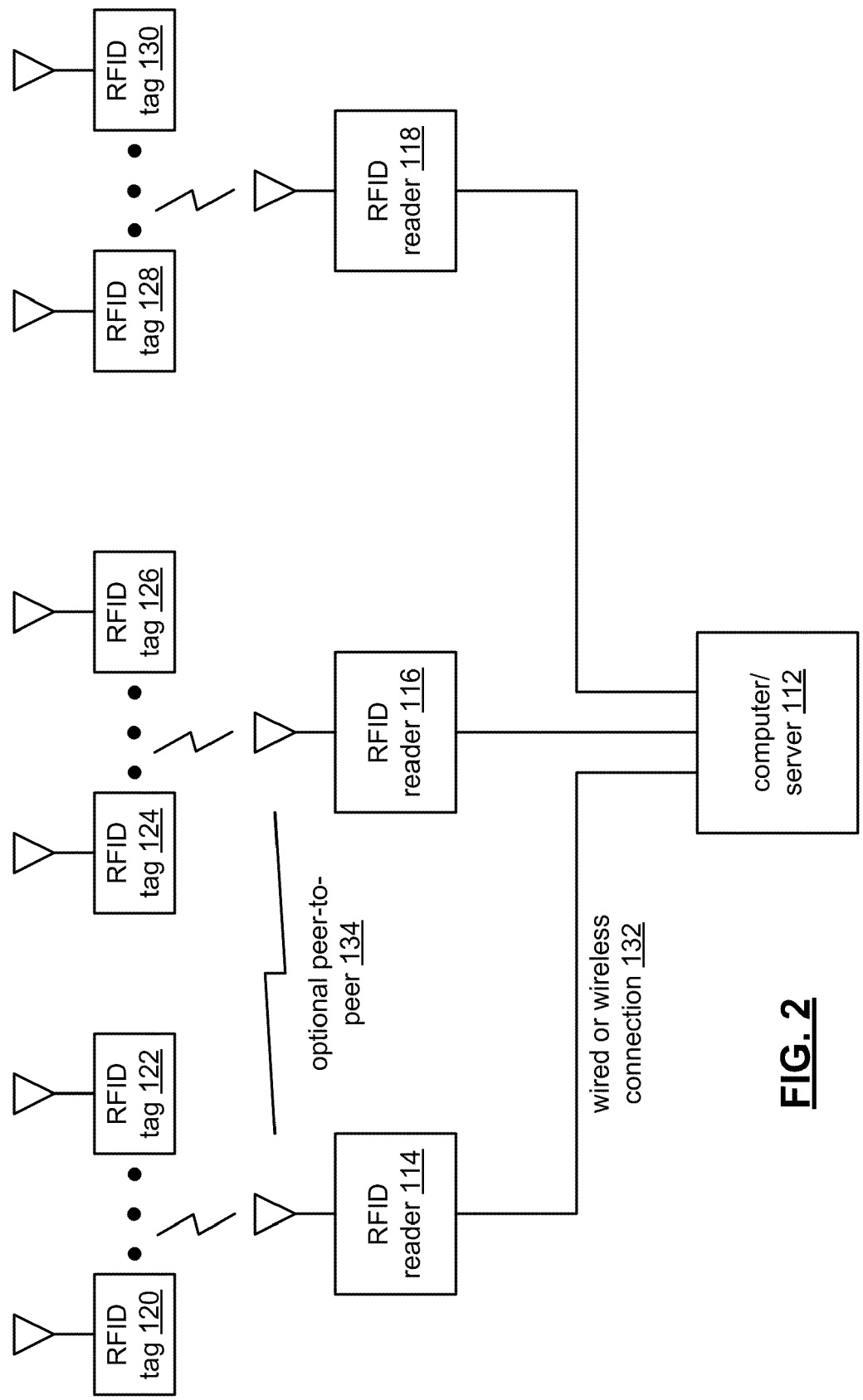
FIG. 2 is a schematic block diagram of a radio frequency identification system in accordance with the present invention.

FIG. 2 is a schematic block diagram of an RFID (radio frequency identification) system that includes a computer/server 112, a plurality of RFID readers 114-118 and a plurality of RFID tags 120-130. The RFID tags 120-130 may each be associated with a particular object for a variety of purposes including, but not limited to, tracking inventory, tracking status, location determination, assembly progress, et cetera.

Each RFID reader 114-118 wirelessly communicates with one or more RFID tags 120-130 within its coverage area. For example, RFID reader 114 may have RFID tags 120 and 122 within its coverage area, while RFID reader 116 has RFID tags 124 and 126, and RFID reader 118 has RFID tags 128 and 130 within its coverage area. The RF communication scheme between the RFID readers 114-118 and RFID tags 120-130 may be a backscattering technique whereby the RFID readers 114-118 provide energy to the RFID tags via an RF signal. The RFID tags derive power from the RF signal and respond on the same RF carrier frequency with the requested data.

In this manner, the RFID readers 114-118 collect data as may be requested from the computer/server 112 from each of the RFID tags 120-130 within its coverage area. The collected data is then conveyed to computer/server 112 via the wired or wireless connection 132 and/or via the peer-to-peer communication 134. In addition, and/or in the alternative, the computer/server 112 may provide data to one or more of the RFID tags 120-130 via the associated RFID reader 114-118. Such downloaded information is application dependent and may vary greatly. Upon receiving the downloaded data, the RFID tag would store the data in a non-volatile memory.

As indicated above, the RFID readers 114-118 may optionally communicate on a peer-to-peer basis such that each RFID reader does not need a separate wired or wireless connection 132 to the computer/server 112. For example, RFID reader 114 and RFID reader 116 may communicate on a peer-to-peer basis utilizing a back scatter technique, a wireless LAN technique, and/or any other wireless communication technique. In this instance, RFID reader 116 may not include a wired or wireless connection 132 to computer/server 112. Communications between RFID reader 116 and computer/server 112 are conveyed through RFID reader 114 and the wired or wireless connection 132, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 2 may be expanded to include a multitude of RFID readers 114-118 distributed throughout a desired location (for example, a building, office site, et cetera) where the RFID tags may be associated with equipment, inventory, personnel, et cetera. Note that the computer/server 112 may be coupled to another server and/or network connection to provide wide area network coverage.

Figure 3:
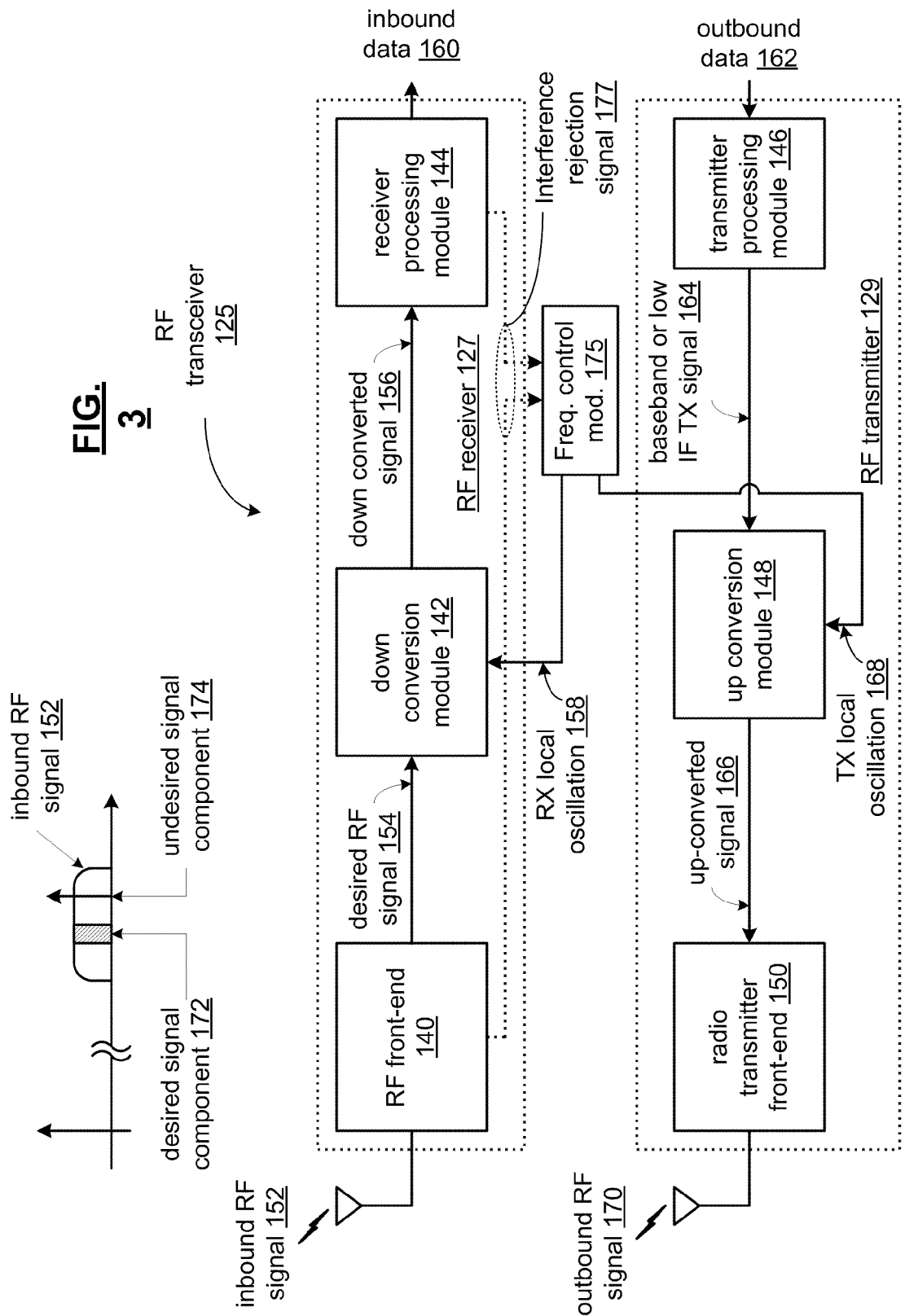
FIG. 3 is a schematic block diagram of an RF transceiver in accordance with the present invention.

FIG. 3 is a schematic block diagram of a wireless transceiver, which may be incorporated in an access point or base station 12 and 16 of FIG. 1, in one or more of the wireless communication devices 18-32 of FIG. 1, in one or more of the RFID readers 114-118, and/or in one or more of RFID tags 120-130. The RF transceiver 125 includes an RF transmitter 129, an RF receiver 127 and a frequency control module 125. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to an antenna, however, the receiver and transmitter may share a single antenna via a transmit/receive switch and/or transformer balun. In another embodiment, the receiver and transmitter may share a diversity antenna structure. In another embodiment, the receiver and transmitter may each use its own diversity antenna structure. In another embodiment, the receiver and transmitter may share a multiple input multiple output (MIMO) antenna structure. Accordingly, the antenna structure of the wireless transceiver will depend on the particular standard(s) to which the wireless transceiver is compliant.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier 84 and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device.

The receiver receives inbound RF signals 152 via the antenna structure, where a base station, an access point, or another wireless communication device transmitted the inbound RF signals 152. The antenna structure provides the inbound RF signals 152 to the receiver front-end 140, which will be described in greater detail with reference to FIGS. 4-7. In general, without the use of bandpass filters, the receiver front-end 140 blocks one or more undesired signals components 174 (e.g., one or more interferers) of the inbound RF signal 152 and passing a desired signal component 172 (e.g., one or more desired channels of a plurality of channels) of the inbound RF signal 152 as a desired RF signal 154.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the RF front end 140 receives an inbound RF signal 152 that includes a desired signal component that is based on the outbound RF signal 170 and that includes an undesired signal component. For instance, RF transceiver 125 can implement an RF tag reader that reads an RF tag, such as an RFID tag or other RF tag device. In this example, inbound RF signal 152 is received from that RF tag that produces the desired signal component by via backscattering and/or amplitude modulating the outbound RF signal 170. Other signals, such as noise and interference from other RF sources present in the environment of RF transceiver 125 produce the undesired signal component of inbound signal 152. RF front-end 140 includes at least one RF combiner module that attenuates the undesired signal component to produce a desired RF signal, such as by cancellation. Further details regarding this combining module and the attenuation produced thereby is presented in conjunction with the FIGS. 4-7.

Frequency control module 175 controls a frequency of the transmitter local oscillation and a frequency of the receiver local oscillation, based on one or more interference rejection signal 177, to control the attenuation of the undesired signal component. In an embodiment of the present invention, the interference rejection signal 177 is generated by the RF front end, such as a signal to noise ratio, signal to interference ratio or other signal that varies with the relative magnitude of the desired signal component, undesired signal component or both. Further, the interference rejection signal 177 can be a measure of the phase difference between the carrier frequency of the desired signal component and the carrier frequency of the outbound RF signal 170. Also, the interference rejection signal 177 can be generated by the receiver processing module 144. For instance, the inbound RF signal 152 can include one or more frames or data packets of data that are encoded with an error correcting code or error detecting code, such as a linear block code, convolutional code or other code that allows receiver processing module to evaluate the performance of a selected carrier frequency based on the reception and analysis of such frames and/or packets and to a generate interference rejection signal 177 that is based on bit error rate, received errors, incorrectly received packets, absence of acknowledgement packets, etc.

In an embodiment of the present invention, frequency control module includes a transmit local oscillator and a receive local oscillator that can operate at a plurality of selected frequencies corresponding to a plurality of carrier frequencies of the outbound RF signal 170. In particular, frequency control module 175 can evaluate a plurality of carrier frequencies and identify a selected carrier frequency with a most favorable value of the interference rejection signal 177. Alternatively frequency control module 175 can evaluate a plurality of carrier frequencies and identify one or more selected carrier frequency when the interference rejection signal compares favorably to an interference rejection threshold, corresponding to performance, such as bit error rate, phase difference, signal to noise ratio and/or signal to interference ration that is favorable, based on the particular application. When a plurality of carrier frequencies are chosen, frequency hopping can be employed among these selected carrier frequencies, and optionally using other non-selected frequencies if the average system performance when considering a number of frequency hops (such as n=4, 8, 16 . . . frequency hops) is determined to be acceptable.

Frequency control module 175 further includes a control module that performs various processing steps to implement the functions and features described herein. Such a control module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 4:
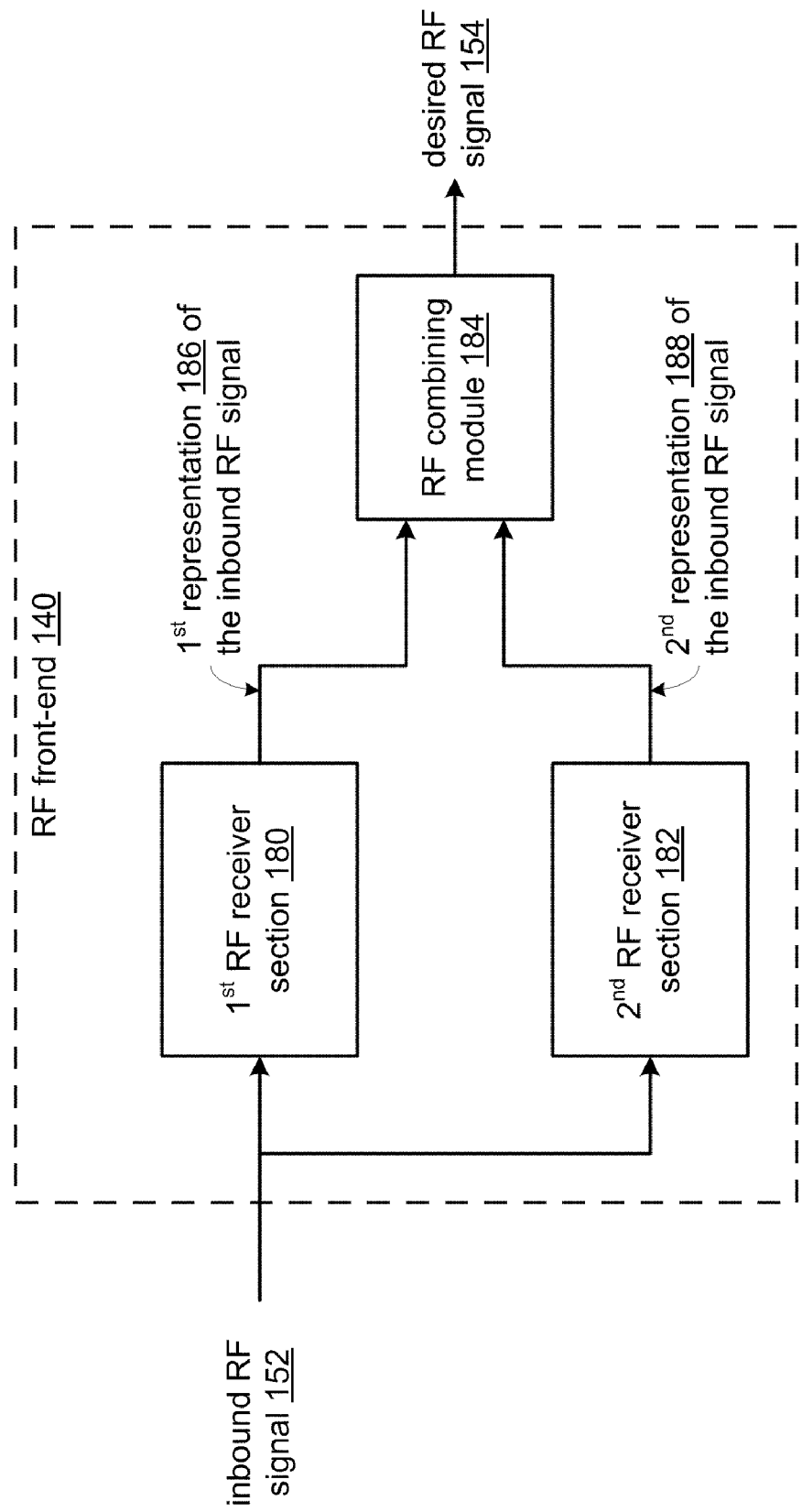
FIG. 4 is a schematic block diagram of an embodiment of an RF front-end in accordance with the present invention.

FIG. 4 is a schematic block diagram of an embodiment of a RF front end 140 that includes a first radio frequency (RF) receiver section 180, a second RF receiver section 182, and an RF combining module 184. The first RF receiver section 180 is coupled to receive the inbound RF signal 152 and provide to a first representation 186 of the inbound RF signal. Note that the inbound RF signal 152 includes a desired signal component 172 and an undesired signal component 174.

The second RF receiver section 182 is coupled to receive the inbound RF signal 152 and to provide a second representation 188 of the inbound RF signal. The RF combining module 184 is coupled to combine the first and second representations 186 and 188 of the inbound RF signal to produce the desired RF signal 154. Note that the desired RF signal 154 includes the desired signal component 172 and an attenuated representation (e.g., 10 dB or more) of the undesired signal component 174.

Figure 5:
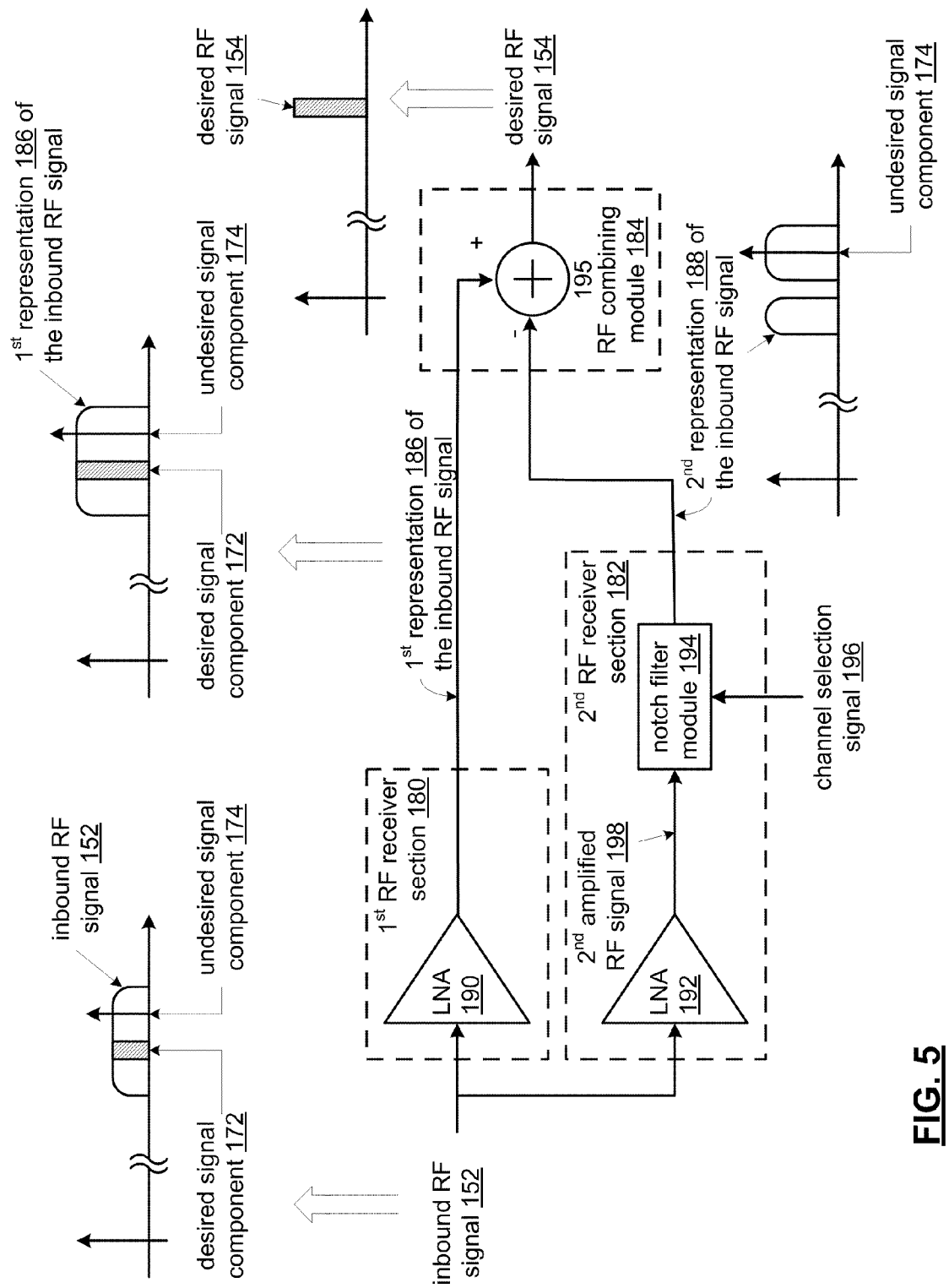
FIG. 5 is a schematic block diagram of another embodiment of an RF front-end in accordance with the present invention.

FIG. 5 is a schematic block diagram of another embodiment of a RF front end 140 that includes a first RF receiver section 180, a second RF receiver section 182, and an RF combining module 184. In this embodiment, the first RF receiver section 180 includes a low noise amplifier (LNA) 190; the second RF receiver section 182 includes a LNA 192 and a notch filter module 194; and the RF combining module 194 includes a subtraction module.

The LNA 190 of the first RF receiver section 180 amplifies the inbound RF signal 152 to produce the first representation 186 of the inbound RF signal. As shown, the first representation 186 of the inbound RF signal includes the desired signal component 172 (e.g., one or more desired channels) and the undesired signal component 174 (e.g., interferers), but at a different magnitude than the inbound RF signal 152. For example, the inbound RF signal 152 may be generated in accordance with a cellular system, as such, it includes a desired signal component 172 or a frequency band of interest (e.g., one or more desired channel(s) of 5-60 MHz centered at a frequency of about 900 MHz, 1800 MHz, 1900 MHz, and/or 2100 MHz) and may further include a significant nearby interferer(s) (e.g., interference from adjacent channel(s), interference from other devices and/or systems using frequencies near the frequency band of interest, and/or transmission blocking signals that occur in RFID systems). Note that the interferers may be at frequencies within a few hundred Mega Hertz from of the frequency of the desired signal component 172. Further note that the bandwidth of the received inbound RF signal 152 is at least partially dependent upon the bandwidth of the LNAs 190 and 192.

LNA 192 of the second RF receiver section 182 amplifies the inbound RF signal 152 to produce a second amplified RF signal 198. The level of amplification used by LNA 192 is substantially equal to the level of amplification used by LNA 190 such that the second amplified RF signal 198 is substantially equal to the first representation 186 of the inbound RF signal.

The notch filter module 194, which may include one or more notch filters having a total roll off of 40 dB or more, notch filters the second amplified RF signal 198 to produce the second representation 188 of the inbound RF signal. The properties of the notch filter module 194 are such that the desired signal component 172 is substantially attenuated while the remaining portion of the inbound RF signal 152, including the undesired signal component 174, is passed substantially unattenuated as shown. Note that the notch filter module 194 may be adjustable, where the notch filter adjustment is based on a channel selection signal 196. As such, the notch filter module 194 may be tuned to accommodate different channels of a plurality of channels.

In another embodiment, the notch filter module 194 may include a mixer that down-converts the second amplified RF signal 198 to a baseband signal or an intermediate frequency (IF) signal. The notch filter module 194 further includes a notch filter, low pass filter, and/or high pass filter coupled to filter the baseband signal or IF signal such that the baseband or IF representation of the desired signal component 172 is attenuated while the baseband or IF representation of the undesired signal component 174 is passed substantially unattenuated. The notch filter module 194 further includes a second mixer that mixes the baseband or IF representation of the undesired signal component 172 with an RF or IF oscillation to produce the second representation 188 of the inbound RF signal.

The subtraction module 195 of the RF combining module 184 subtracts the second representation 188 of the inbound RF signal from the first representation 186 of the inbound RF signal to produce the desired RF signal 154. As such, the desired RF signal 154 includes the desired signal component 172 and minimal other portions of the inbound RF signal, including the undesired signal component 174. Thus, the interferers are substantially attenuated without the use of bandpass filters and without the up to 3 dB loss of the desired signal component associated with the use of bandpass filters.

Figure 6:
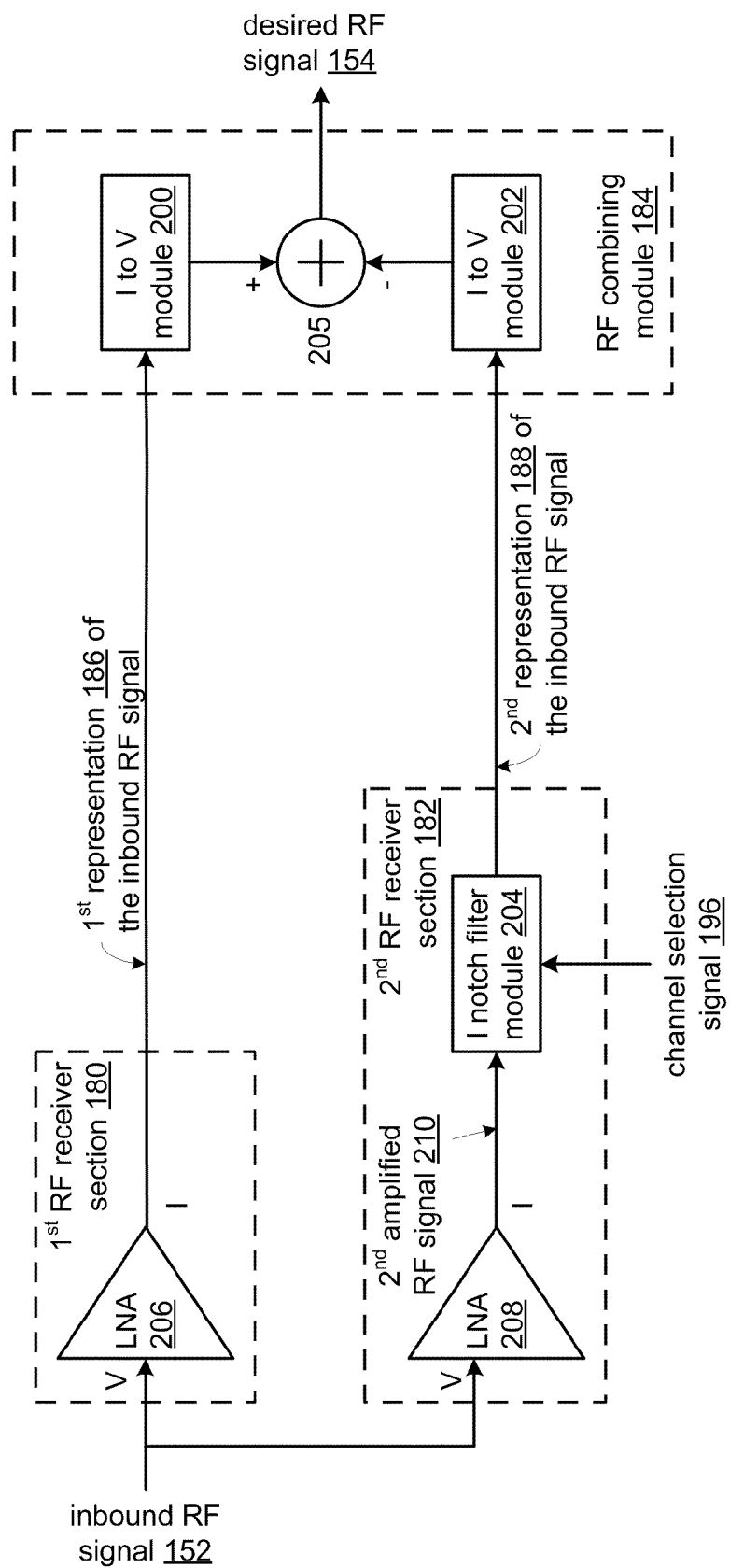
FIG. 6 is a schematic block diagram of another embodiment of an RF front-end in accordance with the present invention.

FIG. 6 is a schematic block diagram of another embodiment of a RF front end 140 that includes a first RF receiver section 180, a second RF receiver section 182, and an RF combining module 184. In this embodiment, the first RF receiver section 180 includes a transconductance low noise amplifier (LNA) 206; the second RF receiver section 182 includes a transconductance LNA 208 and a current based notch filter module 204; and the RF combining module 194 includes a pair of current to voltage conversion modules 200 and 202 and a subtraction module 205.

The transconductance LNA 206 of the first RF receiver section 180 amplifies the inbound RF signal 152 to produce the first representation 186 of the inbound RF signal. In this embodiment, the first representation 186 of the inbound RF signal is a current-based (I) signal while the inbound RF signal 152 is a voltage-based (V) signal. As such, the first representation 186 of the inbound RF signal includes the desired signal component 172 (e.g., one or more desired channels) and the undesired signal component 174 (e.g., interferers).

Transconductance LNA 208 of the second RF receiver section 182 amplifies the inbound RF signal 152 to produce a second amplified RF signal 210, where the second amplified RF signal 210 is a current-based (I) signal. The level of amplification used by LNA 208 is substantially equal to the level of amplification used by LNA 206 such that the second amplified RF signal 210 is substantially equal to the first representation 186 of the inbound RF signal.

The current-based (I) notch filter module 204, which may include one or more notch filters having a total roll off of 40 dB or more, notch filters the second amplified RF signal 210 to produce the second representation 188 of the inbound RF signal. The properties of the notch filter module 204 are such that the desired signal component 172 is substantially attenuated while the remaining portion of the inbound RF signal 152, including the undesired signal component 174, is passed substantially unattenuated. Note that the notch filter module 204 may be adjustable, where the notch filter adjustment is based on a channel selection signal 196. As such, the notch filter module 204 may be tuned to accommodate different channels of a plurality of channels.

The current (I) to voltage (V) module 200, which may be implemented via a transistor, a cascode transistor pair, or any circuit that converts a current-based signal into a voltage-based signal, converts the first representation 186 of the inbound RF signal into a voltage-based signal. The I to V module 200, which may be implemented via a transistor, a cascode transistor pair, or any circuit that converts a current-based signal into a voltage-based signal, converts the second representation 188 of the inbound RF signal into a voltage-based signal. The subtraction module 205 of the RF combining module 184 subtracts the second representation 188 of the inbound RF signal from the first representation 186 of the inbound RF signal to produce the desired RF signal 154. As such, the desired RF signal 154 includes the desired signal component 172 and minimal other portions of the inbound RF signal, including the undesired signal component 174. Thus, the interferers are substantially attenuated without the use of bandpass filters and without the up to 3 dB loss of the desired signal component associated with the use of bandpass filters.

Figure 7:
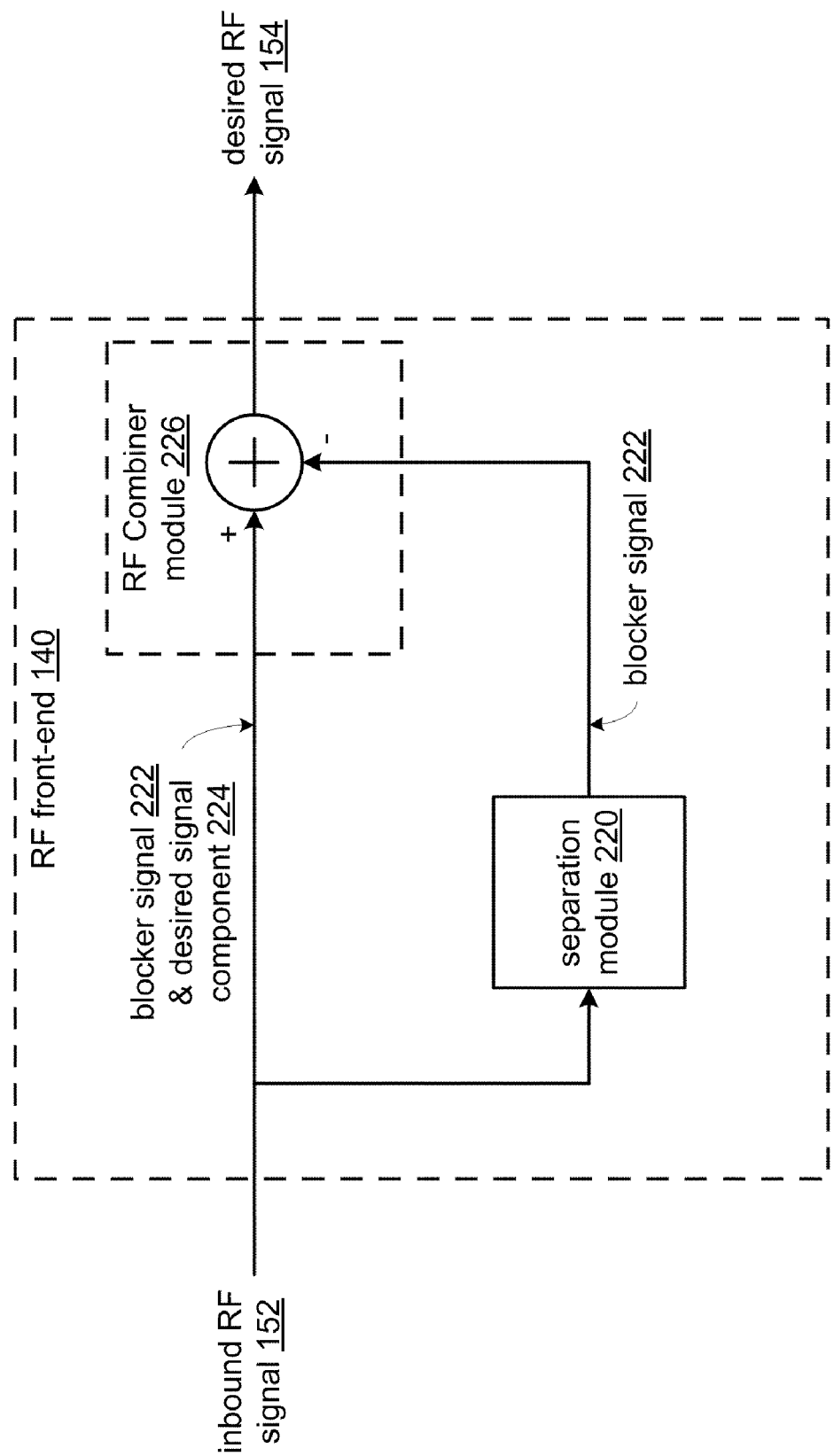
FIG. 7 is a schematic block diagram of another embodiment of an RF front-end front-end in accordance with the present invention.

FIG. 7 is a schematic block diagram of another embodiment of a RF front end 140 that functions to receive an inbound radio frequency (RF) signal 152, wherein the inbound RF signal 152 includes a desired signal component 224 and a blocker signal 222. A separation module 220, separates the blocker signal 222 from the desired signal component 224 to produce a separate blocker signal 222. RF combiner module 226 attenuates the undesired signal component by combining the inbound RF signal 152 with the blocker signal 222. In the embodiment shown, the RF combiner module subtracts the blocker signal from the inbound RF signal 152, however, other operations, including addition, weighted addition, and weighted subtraction can be likewise employed, based on the relative magnitude and phase differences between the inbound RF signal 152 and blocker signal 222. In this embodiment, the blocker signal 222 may be at or near the same frequency as the inbound RF signal 152, which is typically the case for RFID systems.

Figure 8:
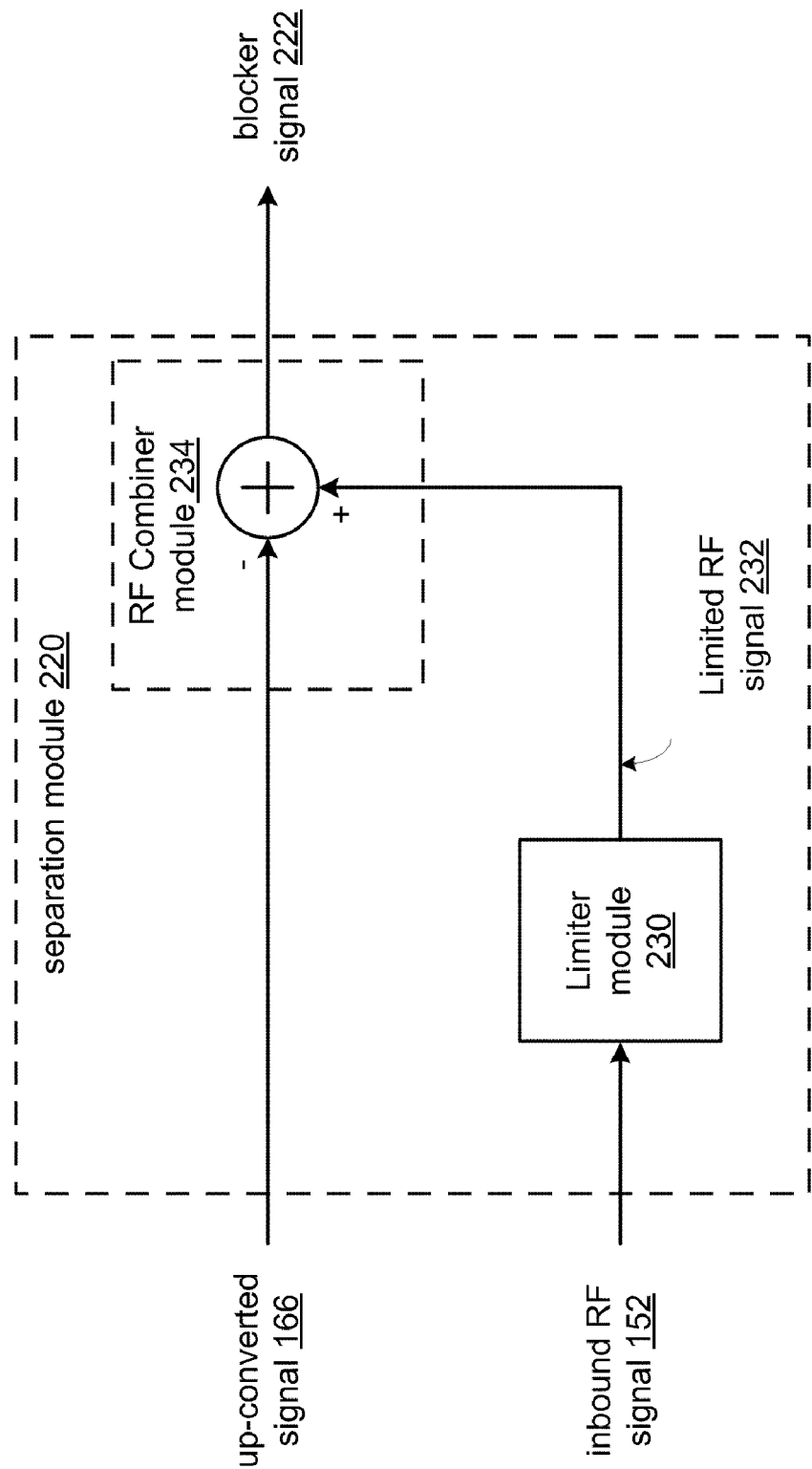
FIG. 8 is a schematic block diagram of a separation module 220 in accordance with an embodiment of the present invention.

Further details regarding a possible implementation of separation module 220 are described in conjunction with FIG. 8.

FIG. 8 is a schematic block diagram of a separation module 220 in accordance with an embodiment of the present invention. In particular, separation module 220 operates based in an environment, such as a RF tag reader whereby the inbound RF signal 152 is based on the outbound RF signal 170. In the example of an RF tag reader, inbound RF signal is amplitude modulated by the RF tag and can have an arbitrary phase, based on the distance (in wavelengths) along the transmission path from the RF tag reader, to the RF tag and back. In addition, the inbound RF signal can have a magnitude that also varies with carrier frequency, distance between the RF tag and the reader, the transmit power and receiver gain and based on other channel conditions.

Separation module 220 includes a limiter module 230 that a limited RF signal 232. This limiter module 230 serves to remove and/or attenuate the amplitude modulation induced by the RF tag on the inbound RF signal 152, and to produce a limited RF signal 232 with a substantially constant magnitude. In an embodiment of the present invention limiter module 230 includes a clipper circuit that amplifies and clips the inbound RF signal to remove amplitude variations and that filters the clipped signal to attenuate the harmonics produced by the non-linear clipping operation. The resulting limited RF signal includes the blocker signal as well as the unmodulated RF signal of outbound carrier signal 170 and inbound carrier signal 152. Blocker signal 222 can be produced by RF combiner module 234 by combining the up-converted signal 166 from the limited RF signal 232 to remove or attenuate the carrier signal from the limited RF signal 232 that removes or attenuates the desired signal component from the limited RF signal 232. In the embodiment shown, the RF combiner module 234 subtracts he up-converted signal 166 from the limited RF signal 232, however, other operations, including addition, weighted addition, and weighted subtraction can be likewise employed, based on the relative magnitude and phase differences between the limited RF signal 232 and up-converted signal 166.

In the example noted above, inbound RF signal 152 is amplitude modulated by the RF tag and can have an arbitrary phase, based on the distance (in wavelengths) along the transmission path from the RF tag reader, to the RF tag and back. However, the phases between the carriers of the inbound RF signal 152 and the up-converted signal 166 must be aligned or nearly aligned to cancel or attenuate the desired component from the blocker signal 222 and therefore to cancel or attenuate the blocker signal 222 (the undesired signal component) from desired RF signal 154. In operation, the frequency control module 175 controls the frequency of the transmitter local oscillation and the frequency of the receiver local oscillation, based on the interference rejection signal, to control the attenuation of the undesired signal component by producing a phase difference between the desired component and the up-converted signal from the RF transmitter within an acceptable range. This phase alignment can be performed either directly or indirectly, the phase shifter between the incoming and outgoing carrier signals can be evaluated for candidate carrier frequencies and the carrier frequency can be selected with the best phase alignment, or a plurality of candidate frequencies can be selected having a phase alignment that falls within an acceptable range of alignment (such as, +/−5 degrees, +/−10 degrees, +/−20 degrees, etc.). In the alternative, the performance can be measured indirectly based on the resulting signal to noise ratio, signal to interference ration, bit error rate, acknowledgement signals received, etc.

While separation module 220 is shown as operating on up-converted signal 166, any other signal that includes the carrier signal at a substantially constant magnitude can likewise be employed.

FIG. 9 is a flowchart representation of a method in accordance with an embodiment of the present invention. In particular a method is presented for use with one or more features and functions described in conjunction with FIGS. 1-8. In step 400, an outbound RF signal is generated at a carrier frequency that is based on a transmitter local oscillation. In step 402, an inbound RF signal is received that includes a desired signal component that is based on the outbound RF signal and that includes an undesired signal component. In step 404, the undesired signal component is attenuated to produce a desired RF signal. In step 406, a down converted signal is generated from the desired RF signal based on a receiver local oscillation. In step 408, inbound data is generated from the down converted signal. In step 410, frequencies of the transmitter local oscillation and the receiver local oscillation are controlled based on an interference rejection signal, to control the attenuation of the undesired signal component.

In an embodiment of the present invention, step 404 includes producing a blocker signal and combining the inbound RF signal with the blocker signal. In addition, the step of producing a blocker signal can include limiting the inbound RF signal to produce a limited RF signal and combining the limited RF signal with an up-converted signal to produce the blocker signal. Further, step 410 can control the attenuation of the undesired signal component by producing a phase difference between the desired component and the up-converted signal that is within an acceptable range. Also, the desired signal component can be received from a remote transmitter that produces the desired signal component by amplitude modulating the outbound RF signal, and the step of limiting the inbound RF signal can attenuate the amplitude modulation from the desired signal component.

In an embodiment of the present invention, step 410 evaluates a plurality of carrier frequencies and identifies a selected carrier frequency with a most favorable value of the interference rejection signal. Step 410 can also identify at least one selected carrier frequency when the interference rejection signal compares favorably to an interference rejection threshold.

In an embodiment, step 408 can include receiving at least one data packet from a remote transmitter and wherein the interference rejection signal is generated based on the reception of the at least one data packet.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) tag transceiver comprises:
    an RF transmitter that generates an outbound RF signal at a carrier frequency that is based on a transmitter local oscillation;
    an RF receiver, coupled to receive an inbound RF signal that includes a desired signal component that is received from an RF tag and that includes an undesired signal component, the RF receiver including a first RF combiner module that attenuates the undesired signal component to produce a desired RF signal, the RF receiver generating a down converted signal from the desired RF signal based on a receiver local oscillation; and
    a frequency control module, coupled to the down conversion module and the RF transmitter, that controls a frequency of the transmitter local oscillation and a frequency of the receiver local oscillation to control the attenuation of the undesired signal component.

2. The RF tag transceiver of claim 1 wherein the RF front end section includes a separation module that produces a blocker signal and wherein the first RF combiner module that attenuates the undesired signal component by combining the inbound RF signal with the blocker signal.

3. The RF tag transceiver of claim 2 wherein the separation module includes a limiter module that limits the inbound RF signal to produce a limited RF signal and a second RF combiner module that produces the blocker signal by combining the limited RF signal with an up-converted signal from the RF transmitter.

4. The RF tag transceiver of claim 3 wherein the frequency control module controls the frequency of the transmitter local oscillation and the frequency of the receiver local oscillation by producing a phase difference between the desired component and the up-converted signal from the RF transmitter within an acceptable range.

5. The RF tag transceiver of claim 3 wherein the limiter module attenuates the amplitude modulation from the desired signal component.

6. The RF tag transceiver of claim 1 wherein the frequency control module evaluates a plurality of carrier frequencies and identifies a selected carrier frequency with a most favorable value of the interference rejection signal.

7. The RF tag transceiver of claim 1 wherein the frequency control module evaluates a plurality of carrier frequencies and identifies at least one selected carrier frequency when an interference rejection signal compares favorably to an interference rejection threshold.

8. The RF tag transceiver of claim 7 wherein the interference rejection signal is generated by the RF front end.

9. The RF tag transceiver of claim 7 wherein the interference rejection signal is generated by the receiver processing module.

10. The RF tag transceiver of claim 7 wherein receiver receives at least one data packet from a remote transmitter and generates the interference rejection signal based on the reception of the at least one data packet.

11. A method comprises:
    generating an outbound RF signal at a carrier frequency that is based on a transmitter local oscillation;
    receiving an inbound RF signal that includes a desired signal component that is based on the outbound RF signal and that includes an undesired signal component;
    attenuating the undesired signal component to produce a desired RF signal;
    generating a down converted signal from the desired RF signal based on a receiver local oscillation; and
    controlling a frequency of the transmitter local oscillation and a frequency of the receiver local oscillation to control the attenuation of the undesired signal component.

12. The method of claim 11 wherein the step of attenuating includes producing a blocker signal and combining the inbound RF signal with the blocker signal.

13. The method of claim 12 wherein the step of producing a blocker signal includes a limiting the inbound RF signal to produce a limited RF signal and combining the limited RF signal with an up-converted signal to produce the blocker signal.

14. The method of claim 13 wherein the step of controlling the frequency of the transmitter local oscillation and the frequency of the receiver local oscillation, controls the attenuation of the undesired signal component by producing a phase difference between the desired component and the up-converted signal that is within an acceptable range.

15. The method of claim 13 wherein desired signal component is received from a remote transmitter that produces the desired signal component by amplitude modulating the outbound RF signal, and wherein the step of limiting the inbound RF signal attenuates the amplitude modulation from the desired signal component.

16. The method of claim 11 wherein the step of controlling the frequency of the transmitter local oscillation and the frequency of the receiver local oscillation includes:
    generating an interference rejection signal;
    evaluating a plurality of carrier frequencies; and
    identifying a selected carrier frequency with a most favorable value of the interference rejection signal.

17. The RF transceiver of claim 16 wherein the step of controlling the frequency of the transmitter local oscillation and the frequency of the receiver local oscillation evaluates a plurality of carrier frequencies and identifies at least one selected carrier frequency when the interference rejection signal compares favorably to an interference rejection threshold.

18. The method of claim 16 further comprising generating inbound data based on the down converted signal including at least one data packet originating from a remote transmitter and wherein the interference rejection signal is generated based on reception of the at least one data packet.

* * * * *